United States Patent
Loiseau

(10) Patent No.: US 7,680,807 B2
(45) Date of Patent: Mar. 16, 2010

(54) METHOD FOR REDUCING SIZE OF A DIGITAL AUDIO, IMAGE OR VIDEO FILE

(75) Inventor: Pascale épouse Gervais Loiseau, Paris (FR)

(73) Assignee: I-CES (Innovative Compression Engineering Solutions), Paris (FR)

( * ) Notice: Subject to any disclaimer, the term of this patent is extended or adjusted under 35 U.S.C. 154(b) by 439 days.

(21) Appl. No.: 11/658,870

(22) PCT Filed: Jul. 30, 2004

(86) PCT No.: PCT/FR2004/002066

§ 371 (c)(1),
(2), (4) Date: Jan. 30, 2007

(87) PCT Pub. No.: WO2006/024704

PCT Pub. Date: Mar. 9, 2006

(65) Prior Publication Data

US 2009/0012978 A1     Jan. 8, 2009

(51) Int. Cl.
*G06F 7/00* (2006.01)

(52) U.S. Cl. .................................. 707/101; 707/103 Y
(58) Field of Classification Search ....... 707/100–103 Y
See application file for complete search history.

(56) References Cited

U.S. PATENT DOCUMENTS

| | | | | |
|---|---|---|---|---|
| 4,135,096 A | * | 1/1979 | Giordano | 378/14 |
| 6,084,227 A | * | 7/2000 | Rhoads | 250/201.9 |
| 6,326,964 B1 | * | 12/2001 | Snyder et al. | 345/419 |
| 2003/0139975 A1 | * | 7/2003 | Perkowski | 705/26 |
| 2004/0208380 A1 | * | 10/2004 | Aoki et al. | 382/232 |
| 2006/0136972 A1 | * | 6/2006 | Metzger et al. | 725/105 |

* cited by examiner

*Primary Examiner*—James Trujillo
*Assistant Examiner*—Linh Black
(74) *Attorney, Agent, or Firm*—Browdy & Neimark, PLLC

(57) ABSTRACT

The inventive method makes it possible to reduce the size of a digital audio, image and/or video file in such a way that a reduced number of representative data needed for reformatting a file is transmitted to a receiving entity encoder. Said method consists in assigning references of at least one file component value to another value of the same component or in integrating at least one reference of the value group of the same component or another component into a component value group.

5 Claims, 2 Drawing Sheets ated values into representative data, of conversion of the group of integrated values and of the group of integrating values into a group of representative data and of

METHOD FOR REDUCING SIZE OF A DIGITAL AUDIO, IMAGE OR VIDEO FILE

BACKGROUND OF THE INVENTION

The present invention concerns a method of size reduction of a digital audio, image and/or video file designed so as only to transmit to a receiving entity a reduced number of representative data, essential for the reconfiguration of the file in its original form using a decoder.

DESCRIPTION OF THE PRIOR ART

It is generally speaking known that in classical size reduction methods, the components of the digital data of a file, layers of colour or video channels, are treated separately. Only grey level images coded on 8 bits and images indexed on a gamut of 256 colour combinations are represented by a single component. Similarly, only certain successive redundant value series are reduced by repeat compression systems. In order to reduce the size of the data, existing compression systems reduce the number of values by component and their height, but continue to code the same number of component as the original ones and the same number of values, since the combination of separate values entails too large an allocation of bits needed for their coding.

OBJECT OF THE INVENTION

The invention has more particularly the aim of dealing with problems generated by the increased optimisation of the rate of compression of digital data, without any appreciable impairment of supplementary quality.

SUMMARY OF THE INVENTION

For this purpose it proposes to reduce the total number of digital data of a grey level single component of an audio (mono), image and/or video file and the number of data of a component and/or the number of components of multi-channel audio files, of RVB, CMJN, YUV images and of RVB and YUV video files, by only transmitting to the encoder representative data comprising references of integrated values and those of integrating values, it being understood that:
- an item of representative data is an association of at least two values and/or the reference of a group of values associated with another group of values, the values or groups of values potentially belonging to the same, or to a different component,
- an integrated value is the quotient of the smaller value of the association of two numbers by the higher value of said two numbers,
- the integrating value is the larger value that it is necessary to reduce in order to be able to code it on one or two bytes when it has received the reference of the integrated value. When it has been reduced and received the integrated value reference, it becomes an item of representative data.

With a view to obtaining this result and with the aim of only transmitting to the coder a reduced number of representative data essential for the reconfiguration of the file in its entirety, the method of reduction according to the invention comprises
- the association of the references of at least one value of a component of this file to another value which may consist of another value of the same component and/or a value of another component; and/or
- the integration into a group of values of a component, of at least one reference of a group of values of the same component or of another component.

This method accordingly makes it possible to effect the size reduction of components and of the number of components of the file by preserving the data characteristic of at least one component and/or a group of values of one or more components, which serve both to code and to restore the original number of values of the components and the original number of components of the reconfigured file according to its original characteristics.

In particular, this method makes it possible to reduce the complete chain of original data to be coded. The reduced component and/or the reduced number of components transmitted to the encoder only contains a reduced number of characteristic data of integrated and preserved values. Thus, for example, the size of an audio file whose component values of the right channel have been integrated into the values or groups of values of the left channel is reduced by 50%. Similarly, the size of an image file or that of a video file can be cut by ⅓ or by ⅔.

One finds that by reducing the number of potential combinations, the method according to the invention increases the compression ratio with respect to systems preserving a number of data and a number of components identical to those of the original file.

Another advantage of this method consists in that it indiscriminately reduces both successive identical and successive different data, in contrast to existing systems, which only reduce the number of successive identical data.

The method according to the invention is advantageously applied indiscriminately to values of the same component (for example a colour component) and to values of different components (for example two different colour components).

It can only use a single component for restoring all source components and provides for a specific image, audio and video reader, authorising a specific display or audition of the digital file optimised by the invention.

BRIEF DESCRIPTION OF THE DRAWINGS

A method of implementing the method according to the invention will be described below as a non-limiting example, referring to the appended drawings where

FIG. 1 is an organigram of the method according to the invention, comprising two stages, namely compression and restoration.

Figure 1:
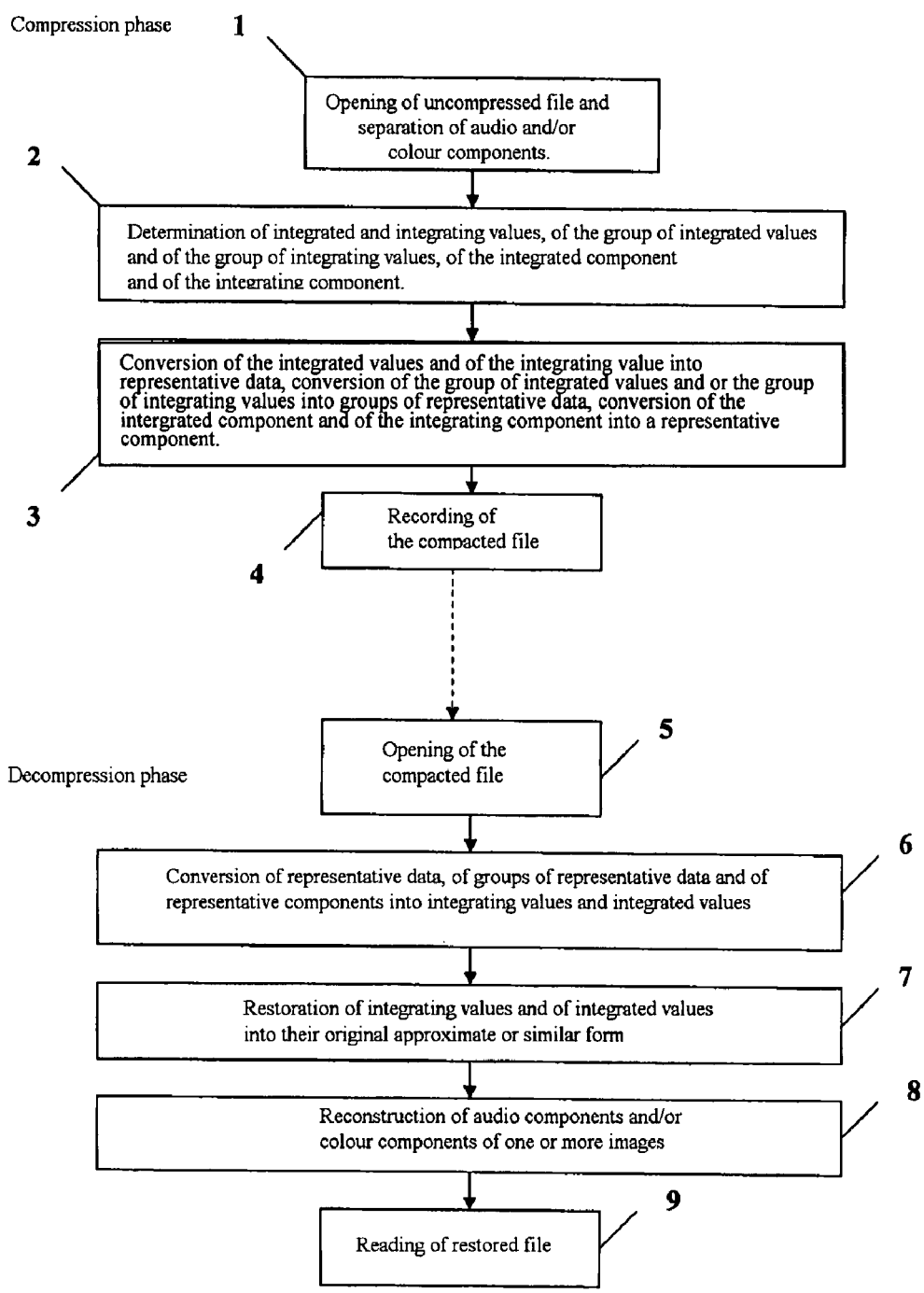
FIG. 1 is a schematic representation illustrating the phases of compression and decompression of the method according to the invention.

The compression stage comprises four phases, namely

DESCRIPTION OF THE PREFERRED EMBODIMENTS a phase of opening the uncompressed file and of separation of the audio components and of separation of colour components (block 1), a phase of determination of integrated values and of integrating values of the group of integrated values and the group of integrating values, of the integrated component and of the integrating component (block 2), a phase of determination of integrated values and of integrating values into representative data, of conversion of the group of integrated values and of the group of integrating values into a group of representative data and of conversion of the integrated component and of the integrating component into a representative component (block 3), and a phase of recording of the compacted file phase (block 4).

The stage of restoration of the compacted file comprises four phases a phase of opening the compacted file (block 5), a phase of conversion of representative data, of groups of representative data and of representative components into integrating values and integrated values (block 6), a phase of restoration of integrating values and of integrated values in their approximate or similar original form (block 7), a phase of reconstruction of audio components and/or colour components of one or more images (block 8) and a phase of reading of the restored file (block 9).

For, for example, an audio file is characterised by two values, namely, on the right by the smaller value equal to "2869" and on the left by the larger value equal to "4024" (integrating value). The integrated value is $(^{2869}/_{4024})=7.10^{-2}$. The reduction of the integrating value (left channel) is $(^{4024}/_{100})=40$.

The association of the integrated and integrating values results in an operating sequence comprising the following two stages:

One starts by calculating the ratio ($C_F$) between the integrated value ($V_I$) and the integrating value ($V_T$), multiplied by 10 and rounded off to a whole value.

$$C_F = \text{rounded off} \left(\frac{V_I}{V_T} \times 10\right)$$

Then, to obtain the representative datum ($Q_R$), one integrates ($C_F$) into the integrating value reduced by a variable coefficient ($C_V$) according to the rate of compression and the desired rate of error.

$$Q_R = \text{rounded off} \left(\frac{V_T}{C_V} \times 10\right) + C_F$$

Thus, $(C_F)=[\text{rounded off. }(^{2869}/_{4024})\times 10]=7$ and $(Q_R)=[\text{rounded off }(^{4024}/_{100})\times 10+(7)]=407$ The restoration demands the dissociation of the representative value ($Q_R$) to reconstitute ($V_T$) and ($V_I$).

$$VT = \text{rounded off} \left(\frac{V_R}{10} \times C_V\right)$$

and the value ($V_I$) is obtained from the following formula:

$$V_I = \left(V_T \times \frac{C_V}{10}\right)$$

In this example, one obtains $(V_T)=(407/10)\times 100=4070$ and $(V_I)=(4070\times 0.7)=2849$. The two restored values are close to the original values (2869 and 4024); the error is less than 1% and therefore unnoticeable.

Figure 2:
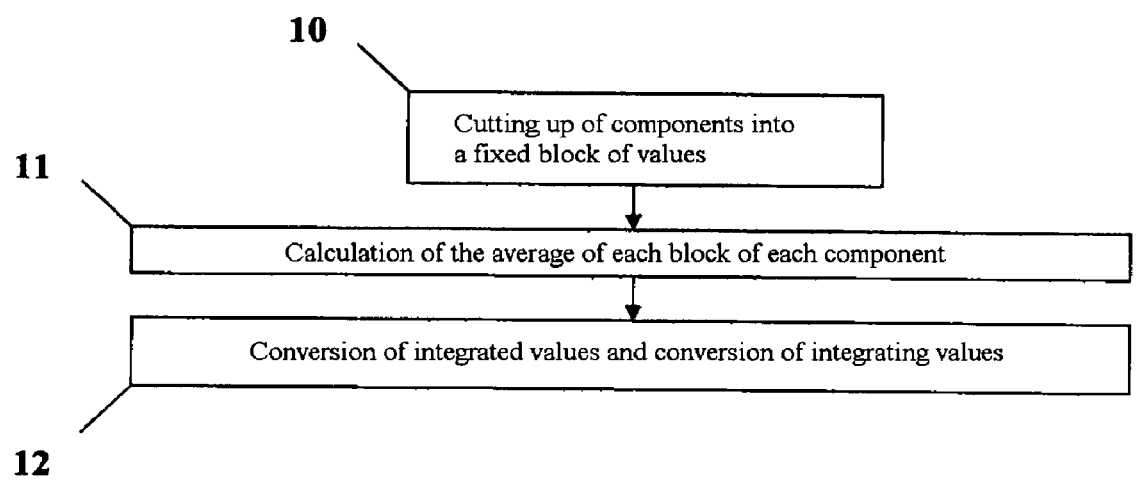
FIG. 2 is a schematic representation illustrating the phase of determination and of conversion of integrated and integrating values.

FIG. 2 represents the stage of determination of groups of integrated values and integrating values. This stage comprises the following phases:

a first phase of cutting up components into fixed value blocks (for example 64 values for image blocks and 80 to 256 for audio samples), a second phase of calculation of the average of each block of each component (equal to the ratio between the sum of the values of the block and the number of values that that block contains). These averages are variable, in such a way that the highest average constitutes the group of integrating values and the other averages constitute the group of integrated values.

a third phase of conversion of groups of integrated values and of groups of integrating values into a group of representative data. Thus, for example, the average of the value of a block of the red layer of an image is 195, the average of a block of the green layer is 128 and the average of the block of the blue layer is 53. The group of integrating values shall be the red block. The conversion of these values into representative data allows the values of the green and blue layers to be grouped together.

In this example, the values of the green layer (6) and of the blue layer (2) can be grouped 2 by 2 into an eight-bit byte.

If values, groups of values and/or components are involved, the rule distinguishing integrated values from integrating values is the function of their difference. The integrated value is represented by the lowest value. The integrating value is the highest value. To determine the integrated values and the integrating values, one cuts the digital file into a fixed group of values (block 10) and effects the average of the values of each block (block 11). In this way one can determine with respect to an audio file, which channel contains the highest values. For an image, one determines in the same way in the case of an RVB image, which is the colour layer R, V or B that contains the integrating data or again in the case of a CMJN image, which components C, M, J or N contain the highest values.

The ratio between the integrated values and the integrating values is calculated and temporarily stored. The conversion of the integrating value is calculated and temporarily stored. Then, the two values are combined and represent a single representative datum.

The invention claimed is:

1. Method for processing an original digital file consisting of a single component of audio, image and/or video file on grey level and/or a number of components of multi-channel audio files, RGB, CMJN, YUV images and/or of RGB and YUV video files, said original digital file being presented in an original form and having a plurality of couples of values, each of said couple comprising a higher value which constitutes an integrated value and a lower value, the two values of each of said couple belonging to a same component or to different components of said original file, said method successively comprising a compressing step for reducing said original file to obtain a compressed file by replacing each of said couples of values by a single compressed representative value which comprises references to said higher value and said lower value to allow an encoder to calculate a reconstituted file having said original form by using said references, said compressing step comprising a phase of calculating an integrated value which is a quotient of a number which represents said lower value by a number which represents said integrating value, a phase of compressing the integrating value according to a desired compression rate an/or error rate to obtain a compressed integrating value, by adding to said compressed integrating value said integrated value to obtain said single compressed representative value and a phase of coding said representative value on one or two bytes.

2. A method according to claim 1,
wherein said compressing stage comprises:
- a phase of opening said original file and of the separating audio components and colour components thereof,
- a phase of determining of integrated values and integrating values of a group of integrated values and a group of integrating values, or of an integrated component and an integrating component,
- a phase of converting said integrated values and said integrating values in representative data, or of converting said group of integrated values and said group of integrating values into a group of representative data or of converting said integrated component and said integrating component into a representative component,
- a phase of generating a compacted file comprising said representative data, said group of representative data or said representative component,
- a phase of recording said compacted file.

3. A method according to claim 2, wherein said reconstituted file is obtained by a sequence comprising:
- a phase of opening said compacted file,
- a phase of converting said representative data, said groups of representative data or said representative components into reconstituted integrating values and into reconstituted values,
- a phase of generating a reconstituted file having audio components and/or colours components of one or more images from said reconstituted integrating values and from said reconstituted integrated values, said reconstituted file having a form similar to that of the original file
- a phase of reading said reconstituted file.

4. Method for processing a digital audio, image and/or video file presented in an original form and having at least an original couple of values comprising a highest value and lowest value, said method successively comprising a step of reducing said original couple of values in a compressed representative value $Q_R$ and a step of constituting a reconstructed file having a form similar to that of the original file from said compressed representative value $Q_R$ wherein
i) said reducing step comprises the following phases
- a first phase of selecting said couple of values,
- a second phase of determining for each of said couple an integrating value $V_T$ consisting of said highest value of said couple and an integrated value equal to the quotient of said lowest value $V_I$ by said highest value,
- a third phase of determining a compressed representative value $Q_R$ from which a reconstructed file having a reconstructed couple of values close to said original couple of values can be obtained, said compressed representative value $Q_R$ being equal to the sum of a first value $C_F$ and a second value, said first value being equal to a product of a ratio between said integrated value multiplied by ten into the said integrating value $V_T$, said ratio being rounded off to a whole value, according to a first formula:

$$C_F = \text{rounded off} \left( \frac{V_I}{V_T} \times 10 \right)$$

said second value being equal to a rounded up ratio between the integrating value and a coefficient ($C_V$) relative to a desired rate of compression and/or to a desired rate of error said rounded ratio being multiplied by ten, according to a second formula:

$$Q_R = \text{rounded up} \left[ \frac{V_T}{C_V} \right] \times 10 + C_F$$

ii) the step of constituting said reconstructed file comprises the following phases:
- a fourth phase of calculating a reconstituted integrating value $V_T^*$ according a third formula $$V_T^* = \text{rounded up} \left[ \frac{Q_R}{10} \times C_V \right]$$

- a fifth phase of calculating a smaller reconstituted value $V_I^*$ according to the fourth formula:

$$V_I^* = \left[ V_T^* \times \frac{C_F}{10} \right]$$

- a sixth phase or reconstituting a reconstructed file with a couple formed by said reconstituted integrating value $V_T^*$ and by said smaller reconstituted value $V_I^*$.

5. Method for processing a digital file having several components, said method comprising:
- a first step of cutting up said components into fixed value blocks,
- a second step of calculating an average of each block of each of said components by calculating a ratio between the sum of the values of the block and the number of values contained in said block,
- a third step of determining at least a group of integrating values $V_T$ comprising the values having the highest average and a group having lowest values,
- a fourth step of conversion of the group of integrated values and of the group of integrating values into a single group of representative data $Q_R$ wherein each representative data $Q_R$ of said single group is calculated according to the relation:

$$Q_R = \text{rounded up} \left[ \frac{V_T}{C_V} \right] \times 10 + C_F$$

with
$C_V$=coefficient relative to a desired rate of compression and/or a desired rate of error $$C_F = \text{rounded up} \left( \frac{V_I}{V_T} \times 10 \right)$$

- a fifth step of calculating a reconstituted integrating value and a reconstituted integrated value according to a process comprising for each value of the group of representative data $Q_R$:

a stage of calculating the reconstituted integrating data $V_T^*$ according to the formula:

$$V_T = \text{rounded off}\left(\frac{Q_R}{10} \times C_V\right)$$

a stage of calculating a lowest reconstituted value $V_I^*$ of a reconstituted file according to the formula $$V_I^* = \left[V_T^* \times \frac{C_F}{10}\right].$$

* * * * *

UNITED STATES PATENT AND TRADEMARK OFFICE
Certificate

Patent No. 7,680,807 B2                                                        Patented: March 16, 2010

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Pascale épouse Gervais Loiseau, Paris (FR); and Than Marc Eric Gervais, Paris (FR).

Signed and Sealed this Tenth Day of January 2012.

JAMES TRUJILLO
*Supervisory Patent Examiner*
Art Unit 2159
Technology Center 2100